(12) United States Patent
Aggarwala et al.

(10) Patent No.: US 7,195,456 B2
(45) Date of Patent: Mar. 27, 2007

(54) TURBINE ENGINE GUIDE VANE AND ARRAYS THEREOF

(75) Inventors: Andrew S. Aggarwala, East Hartford, CT (US); Richard E. Gacek, South Windsor, CT (US); Joel H. Wagner, Wethersfield, CT (US); Jeff S. Noall, South Windsor, CT (US); Timothy S. Snyder, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 142 days.

(21) Appl. No.: 11/019,870

(22) Filed: Dec. 21, 2004

(65) Prior Publication Data

US 2006/0133930 A1 Jun. 22, 2006

(51) Int. Cl.
*F01D 1/02* (2006.01)
(52) U.S. Cl. ............................... 415/208.2; 415/211.2; 416/233; 416/242
(58) Field of Classification Search ............. 415/208.1, 415/208.2, 211.2; 416/232, 233, 242
See application file for complete search history.

(56) References Cited

U.S. PATENT DOCUMENTS

| | | | |
|---|---|---|---|
| 1,890,120 A | 12/1932 | Klinger | |
| 2,570,889 A * | 10/1951 | Van Lammeren | 192/3.33 |
| 3,128,939 A | 4/1964 | Szydlowski | 230/134 |
| 3,174,681 A | 3/1965 | Monroe | 230/134 |
| 3,745,629 A | 7/1973 | Pask et al. | 29/156.8 |
| 3,866,305 A * | 2/1975 | Conn, Jr. | 228/160 |
| 4,624,104 A * | 11/1986 | Stroem | 60/806 |
| 4,826,400 A | 5/1989 | Gregory | 415/181 |
| 4,989,406 A | 2/1991 | Vdoviak et al. | 60/261 |
| 5,342,170 A * | 8/1994 | Elvekjaer et al. | 415/192 |
| 6,055,804 A | 5/2000 | Hammond et al. | 60/39.5 |
| 6,082,966 A | 7/2000 | Hall et al. | 415/209.1 |
| 6,116,856 A | 9/2000 | Karadgy et al. | 416/203 |
| 6,164,919 A | 12/2000 | Vanmoor | 416/243 |
| 6,168,384 B1 | 1/2001 | Vanmoor | 416/243 |
| 6,195,983 B1 | 3/2001 | Wadia et al. | 60/226.1 |
| 6,338,609 B1 | 1/2002 | Decker et al. | 415/173.1 |
| 6,499,942 B1 | 12/2002 | Nonaka et al. | 415/90 |
| 6,502,383 B1 | 1/2003 | Janardan et al. | 60/226.1 |
| 6,662,546 B1 | 12/2003 | Giffin, III | 60/39.5 |
| 2004/0255573 A1* | 12/2004 | Rago | 60/262 |

* cited by examiner

*Primary Examiner*—Hoang Nguyen
(74) *Attorney, Agent, or Firm*—Kenneth C. Baran

(57) ABSTRACT

An exit guide vane array for a turbine engine includes a set of guide vanes 28 having a solidity and defining fluid flow passages 74 with a chordwisely converging forward portion 80. The high solidity and convergent passage portion 80 resist fluid separation. The vanes may also cooperate with each other to restrict an observer's line of sight to planes upstream of the vane array.

16 Claims, 4 Drawing Sheets

TURBINE ENGINE GUIDE VANE AND ARRAYS THEREOF

STATEMENT OF GOVERNMENT INTEREST

This invention was made under U.S. Government Contract N-00019-02-C-3003. The Government has certain rights in the invention.

TECHNICAL FIELD

This invention relates to exit guide vanes and arrays thereof for turbine engines and particularly to a vane array that exhibits good aerodynamic performance across a spectrum of operating conditions and that interrupts an observer's line of sight to components upstream of the vanes.

BACKGROUND OF THE INVENTION

Aircraft turbine engines include a turbine module for extracting energy from a fluid stream comprising hot, gaseous products of combustion. The turbine module includes one or more arrays of blades and one or more arrays of vanes. Each blade array comprises multiple blades projecting radially outwardly from a rotatable hub. One array of guide vanes resides aft of the aftmost array of blades. These vanes are referred to as exit guide vanes. During engine operation, the fluid stream flows through the turbine module causing each blade array and its associated hub to rotate about a rotational axis. The rotating blades impart a substantial circumferential velocity component or swirl to the fluid stream, which reduces the thrust output of the engine. The fluid stream discharging from the aftmost array of blades flows through the array of exit guide vanes which deswirls the fluid, causing it to flow in a substantially axial direction thereby restoring thrust output that would otherwise be lost.

Ideally, the exit guide vanes must satisfy several requirements. One requirement, as noted above, is to turn or deswirl the combustion gases coming off the aftmost array of blades so that the gases exit the turbine module in a substantially axial direction. Second, the guide vanes must be able to tolerate changes in the incidence angle of the oncoming gas stream. The incidence angle depends on the circumferential component of velocity imparted to the fluid stream by the blades. This component varies considerably as a function of engine power. In particular, the guide vanes must be able to capture and redirect the gas stream across a wide range of incidence angles without being susceptible to aerodynamic separation and the attendant aerodynamic losses. A third requirement is that the guide vane array must have enough flow capacity to accept the full volume of combustion gases delivered to it. Otherwise the guide vane array would choke the flow through the turbine resulting in a shortfall in thrust. Fourth, in some military applications it is desirable for the guide vanes to block or interrupt an external observer's line of sight to the hot, rotating blades. This helps make the engine and its host aircraft less conspicuous to radar and infrared detection equipment.

It is difficult to concurrently satisfy all these requirements with conventional vanes. A vane having a conventional airfoil cross-section benefits from a large leading edge radius and large leading edge wedge angle which allow the vane to tolerate a wide range of incidence angles without being susceptible to fluid separation. However the large radius and wedge angle constrain the flow capacity of the vane array. Flow capacity can be restored by using a smaller quantity of vanes, however doing so can establish a line of sight to the hot blades, making the engine and its host aircraft vulnerable to detection. The line of sight can be interrupted by using wide chord vanes, but such vanes have the disadvantage of introducing undesirable weight, possibly even more weight than was saved by reducing the quantity of vanes. Alternatively, the line of sight can be interrupted by using highly cambered vanes. However an individual highly cambered vane is susceptible to aerodynamic separation, and an array of such vanes may not have adequate flow capacity.

It may also be possible to satisfy the conflicting requirements by employing variable pitch angle vanes, however this has the considerable disadvantage of introducing additional weight, cost and complexity into the engine.

What is needed is a simple, light weight vane array that exhibits satisfactory aerodynamic performance across a spectrum of operating conditions and that interrupts an observer's line of sight to components residing upstream of the vanes.

SUMMARY OF THE INVENTION

According to one embodiment of the invention, the guide vanes of a turbine engine guide vane array define a set of fluid flow passages having a chordwisely converging forward portion. The vane array also has a solidity sufficient to resist separation of fluid flowing through the passages.

In another embodiment the vanes cooperate to obstruct an observer's line of sight to a selected plane upstream of the vane array.

The foregoing and other features of the various embodiments of the invention will become more apparent from the following description of the best mode for carrying out the invention and the accompanying drawings.

BEST MODE FOR CARRYING OUT THE INVENTION

Figures 1, 2:
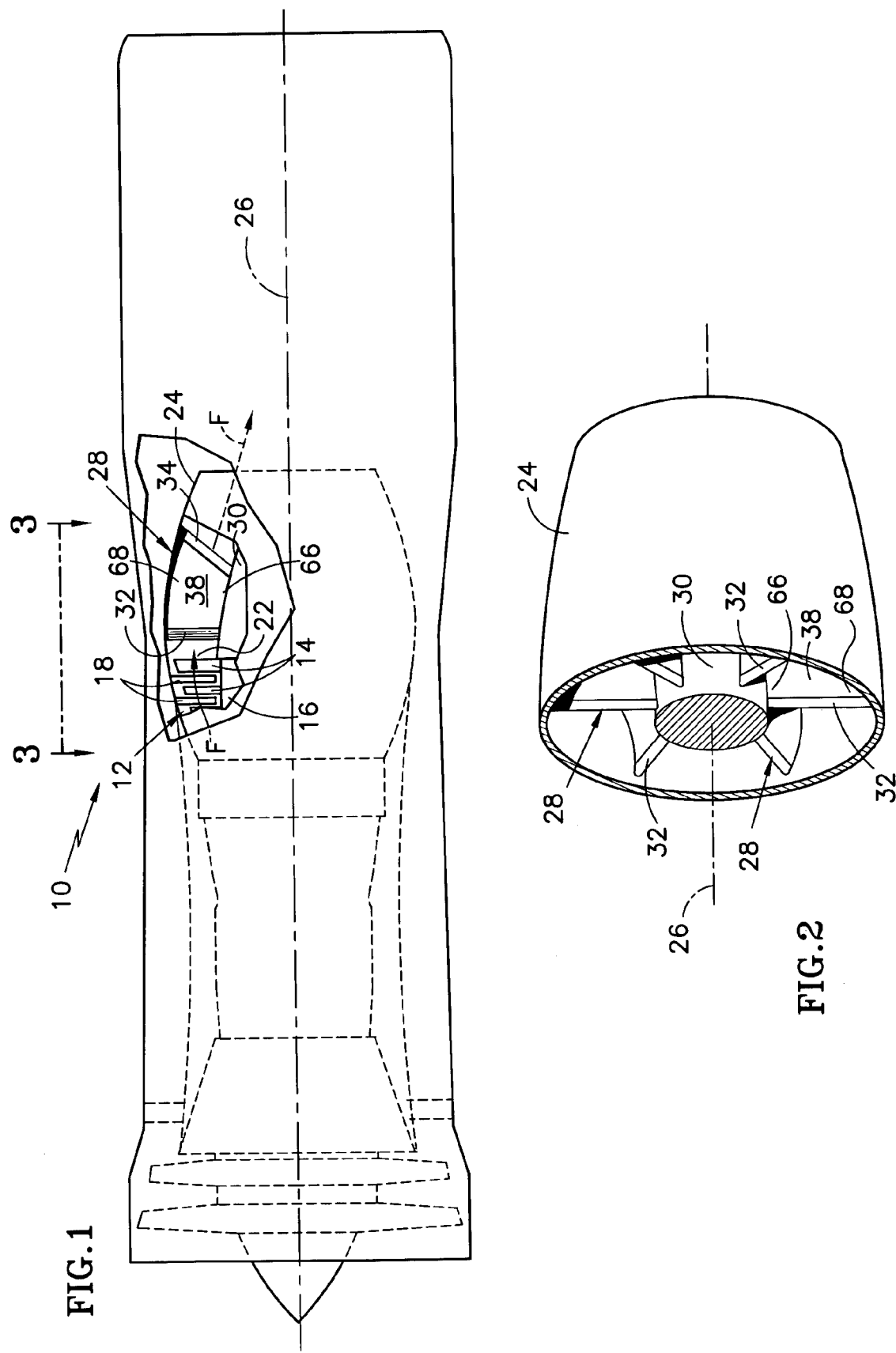
FIG. 1 is a schematic, cross sectional side elevation view of a gas turbine engine showing a turbine module including an array of exit guide vanes.
FIG. 2 is a schematic, perspective view of the aft end of the turbine module of FIG. 1 showing the exit guide vanes circumscribed by a turbine exhaust case.

Referring to FIGS. 1 and 2, a turbine module 10 includes a low pressure turbine 12 with one or more arrays of circumferentially distributed blades 14 projecting radially from a rotatable hub 16, and one or more arrays of circumferentially distributed stator vanes 18. The blades and vanes span radially across a flowpath 22. A case 24 circumscribes the blades and defines the radially outer boundary of the flowpath. During engine operation the hub and blades rotate about axis 26 and extract energy from a stream of fluid F flowing through the turbine module.

Figure 3:
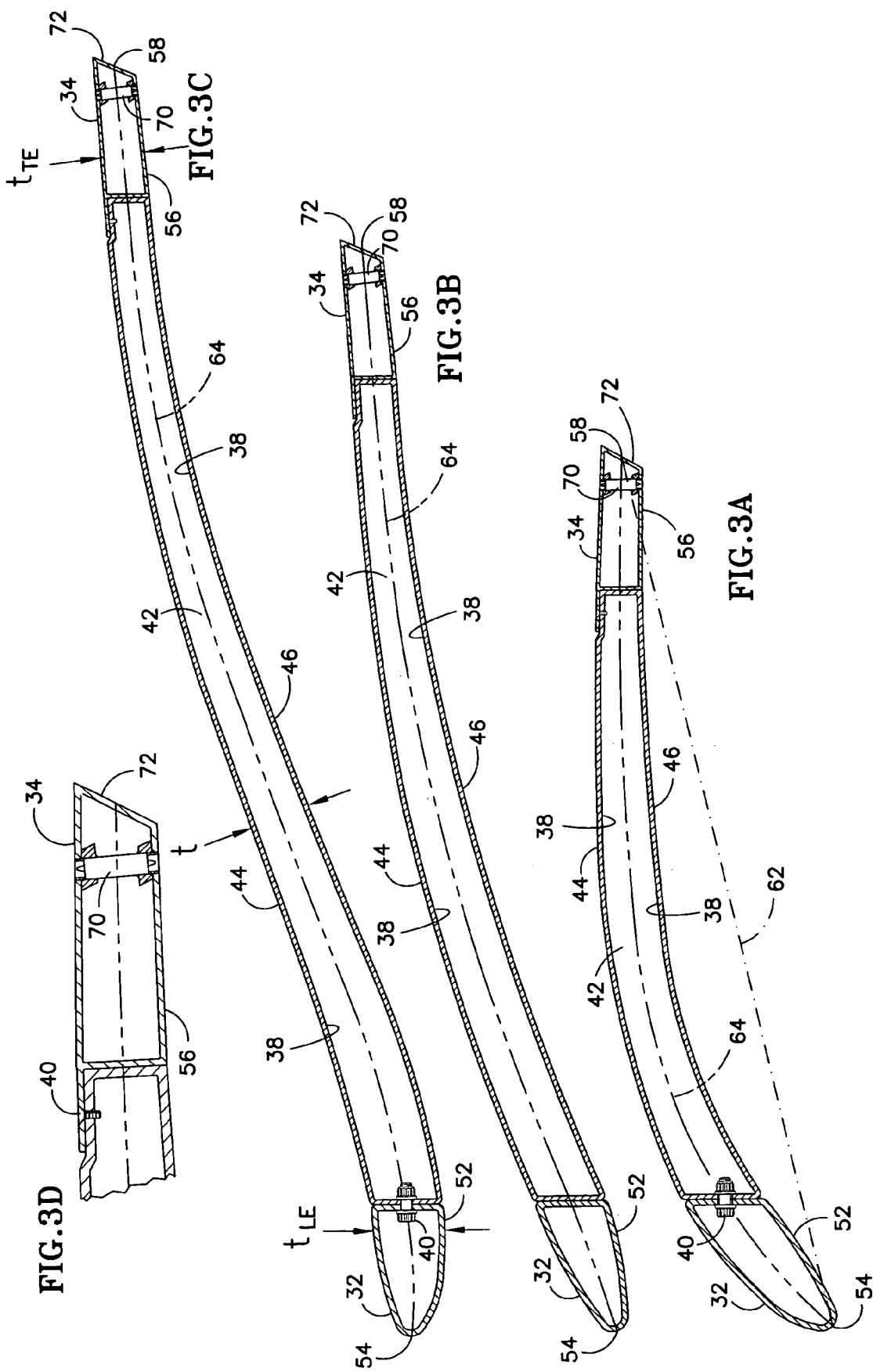
FIGS. 3A, 3B and 3C are a set of views in the direction 3—3 of FIG. 1 showing typical exit guide vane cross sectional profiles in the vicinity of the root (FIG. 3A) midspan (FIG. 3B) and tip (FIG. 3C) of the vane.
FIG. 3D is an enlarged view of the aft end of the cross sectional profiles of FIGS. 3A–3C.
Figure 4:
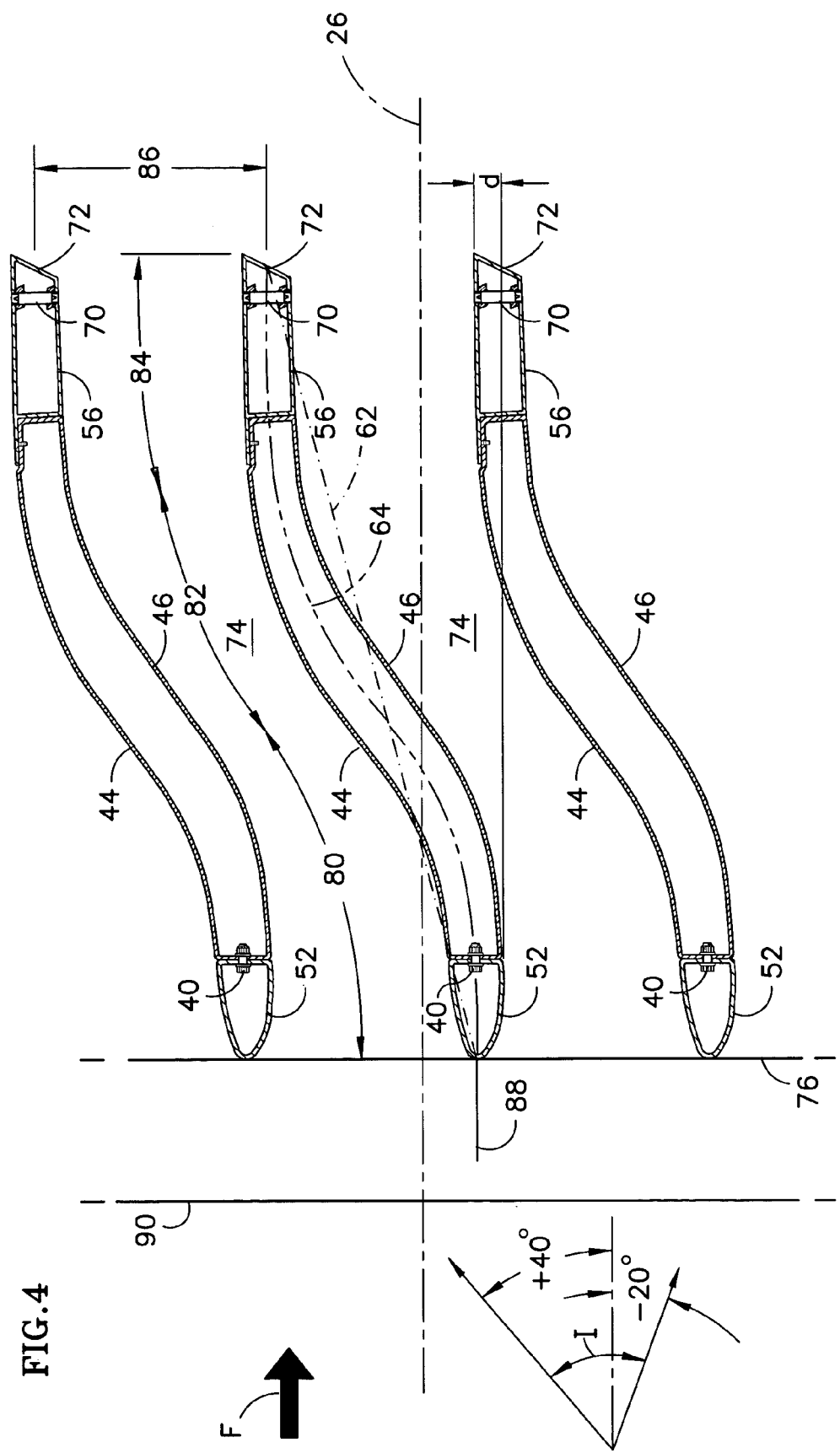
FIG. 4 is a radially looking view showing three circumferentially neighboring guide vanes near the vane tips.

Referring additionally to FIGS. 3 and 4, the turbine module also includes an array of circumferentially distributed exit guide vanes 28 spanning radially across the flowpath between the case 24 and a centerbody 30. The array of guide vanes is called upon to perform the functions already described. A seen best in FIGS. 3A–3C, each vane comprises a cast leading segment 32, a cast or sheet metal trailing segment 34 and sheet metal panels 38 extending between and bolted to the cast segments by bolts 40. The segments and panels cooperate to define a cavity 42. Numerous film cooing holes, not illustrated, penetrate the panels and the trailing edge segment. Cooling air supplied to cavity 42 flows through the film cooling holes and forms a coolant film on the flowpath exposed surfaces 44, 46 to protect the vane from thermal damage and to make it less susceptible to thermal detection. The cavity may also house service lines, such as oil or hydraulic lines, not shown.

Each guide vane 28 has a leading end 52 with a leading edge 54 and a trailing end 56 with a trailing edge 58. A chord line 62, depicted only in FIGS. 3A and 4, extends linearly from the leading edge to the trailing edge. A mean camber line 64 extends from the leading edge to the trailing edge midway between surfaces 44, 46. Each vane also has a lateral thickness t. Each vane spans radially across the flowpath 22 from a vane root 66 to a vane tip 68 (FIGS. 1 and 2). The vane chord, which is the length of the chord line 62, progressively increases from the root to the tip. In particular, the leading edge 54 is oriented substantially radially whereas the trailing edge 58 is oriented so that the tip of the vane at the trailing edge is further aft than the root of the vane at the trailing edge (FIGS. 1 and 3A–3C). This geometry helps scatter any incident radar signals. In addition, the longer chord length near the tip accommodates the fact that the incidence angle of the oncoming fluid stream varies with vane span such that more fluid turning (deswirling) is required near the tip than near the root. The progressively increasing chord helps satisfy this requirement.

Referring to FIG. 4, in applications where afterburning capability is desired, the vane may also include fuel injector elements 70 for admitting fuel into the flowpath and an accompanying scarfed surface 72 to serve as a flame stabilizer.

Each neighboring pair of vanes defines a fluid flow passage 74 having an inlet plane 76. Each passage has a chordwisely converging forward portion 80, i.e. a portion that diminishes in area with increasing distance from the inlet plane, a diverging mid-portion 82 and an aft portion 84 that ideally is non-convergent.

The vane array has a spanwisely varying solidity, which is the local ratio of chord to pitch at any given spanwise location, where pitch is the circumferential separation 86 between neighboring vanes. The solidity of the inventive vane array is high enough to resist fluid separation from surfaces 44, 46, i.e. the high solidity prevents separation from occurring or encourages momentarily separated fluid to quickly re-attach to the surfaces. In the illustrated embodiment, the solidity is at least about 3.

Figure 6:
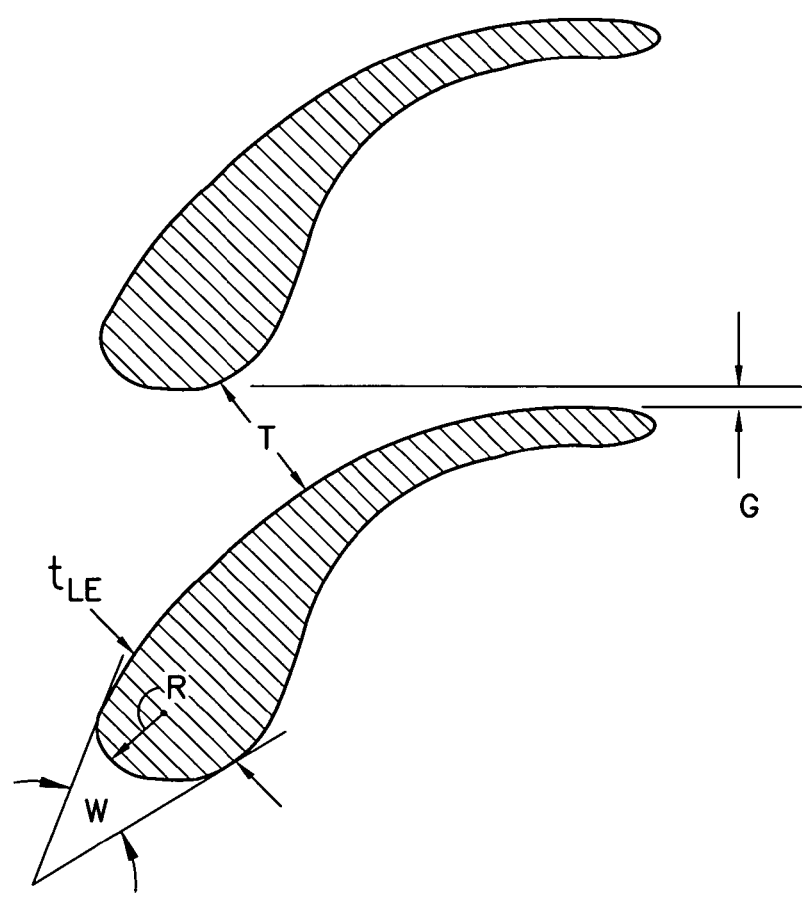
FIG. 6 is a radially looking view showing two circumferentially neighboring conventional guide vanes.

Each vane has a leading end lateral thickness $t_{LE}$ and a trailing end lateral thickness $t_{TE}$ (FIGS. 3A–3C). The leading and trailing end lateral thicknesses are determined where the thickness is changing only gradually with chord, rather than where the surfaces 44, 46 taper precipitously toward each other. The leading end thickness of the inventive vane is considerably smaller than that of a conventional vane, which is shown in FIG. 6. The leading end thickness $t_{LE}$ is approximately equal to the trailing end thickness $t_{TE}$. The thin leading end allows the vane to tolerate a satisfactorily wide range of incidence angles of the oncoming fluid stream F without unacceptably restricting the flow capacity of the vane array or incurring other disadvantages associated with the conventional vanes illustrated in FIG. 6. Although these conventional vanes can tolerate a wide range of incidence angles, they require large leading edge radius R and/or a large wedge angle W to achieve this capability. As a result, they suffer from the disadvantages previously discussed, in particular poor flow capacity due to the small throat T, susceptibility to fluid separation due to the divergence of the passage aft of the throat and the camber of the airfoils, and vulnerability to radar or infrared detection due to little or no circumferential overlap between the leading and trailing edges as indicated by gap G.

The fluid stream F approaches the vane array at an angle of incidence I that varies across a range of values. In the example of FIG. 4, the range of incidence angle values is about +40 degrees to −20 degrees (relative to the engine axis 26) for a total range of about 60 degrees. Moreover, the local Mach number of the fluid stream varies from a relatively high value at the +40 degree orientation to a relatively low value at the −20 degree orientation. When the Mach number is high, the fluid stream experiences more difficulty turning into the passages 74 than when the Mach number is lower. Accordingly, the chord line 62 of each vane is oriented so that it is more closely aligned with the high Mach number end of the incidence angle range (the +40 degree end) than with the low Mach number end of the range (the −20 degree end). In the example of FIG. 4, the chord line is at an angle of about +15 degrees. In addition, the leading edge orientation, which is indicated by the tangential linear extension 88 to the mean camber line, is within the range of incidence angle values, and ideally is near the middle of the range. In the example of FIG. 4, vane leading edges are oriented approximately parallel to the axis 26. The trailing edges 58 are oriented approximately axially so that fluid discharging from the passages 74 has no appreciable circumferential velocity component. This combination of chord line and leading edge orientations and the resultant convergence and curvature of the passages 74 (first toward the top of the illustration and then more axially) helps the higher Mach number fluid turn into the passages 74 without separating from the vane surfaces (or with minor enough separation that the curvature of the passages encourages the fluid to reattach to the vane surfaces). Other combinations of chord line orientation and direction of curvature (i.e. curvature in which the passages 74 first turn toward the bottom of the illustration) can result in the chord line being aligned with the low Mach number end of the incidence angle range, the leading edge being substantially misaligned with the middle of the incidence angle range, the trailing edge being oriented nonaxially, or some combination thereof.

As seen best in FIG. 4, the vanes cooperate with each other to obstruct an observer's line of sight from aft of the vane array to a selected plane 90 upstream of the vane array. Typically, the selected plane is the plane formed by the trailing edges of the rotatable blades upstream of the exit guide vanes. The visual obstruction is effected by the relative circumferential positions of the trailing end of each vane and the leading end of its neighboring vane. In the example of FIG. 4, which shows the guide vanes in the vicinity of the vane tips, the visual obstruction across at least part of the vane span (i.e. near the tip of the vane array) is effected by ensuring that the trailing end 56 of each vane circumferentially overlaps the leading end 52 of the neighboring vane by an overlap distance d. This is achieved by reversing the curvature of the mean camber line 64 at least once. This is evident in FIGS. 3B, 3C and 4 where a forward portion of each mean camber line is concave and an aft portion is convex. At cross sections closer to the root of the blade, the required overlap may be readily achieved without reversing the curvature of the mean camber line. This is seen in FIG. 3A where there is no reversal of curvature.

For the vane array of FIG. 4, the combination of high solidity and overlap distance d obstructs an observer's view of any plane upstream of the vane array, not just the view of illustrated plane 90, provided that observer's line of sight is parallel or nearly parallel to the engine axis 26. Certain planes upstream of the vane array may be visible to an observer whose line of sight is oblique to the axis. However when the observer's line of sight intersects the turbine case 24, planes upstream of the intersection will be visually inaccessible to the observer. Moreover, the angle at which an observer can view through the vane passages 74 is limited by ductwork, such as exhaust ducts, that extend axially aft of the guide vane array. These factors are accounted for in determining the solidity and overlap required for a specific application.

Figure 5:
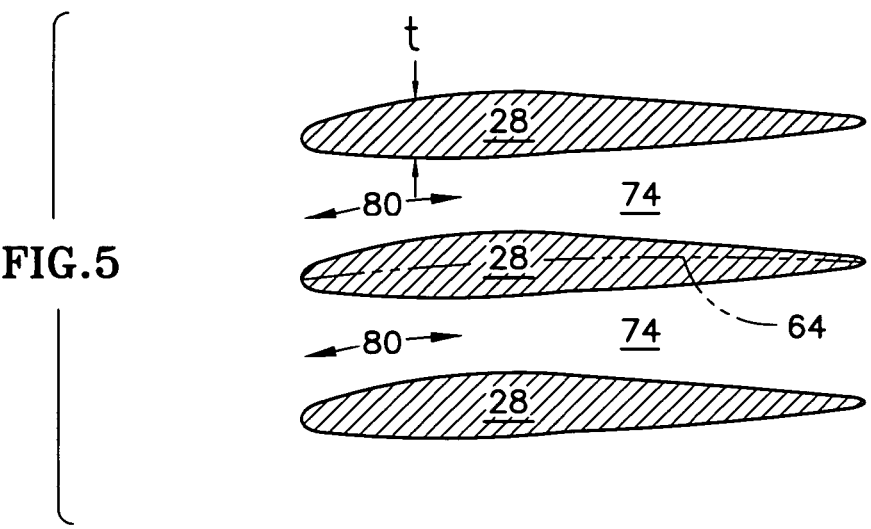
FIG. 5 is a radially looking view showing three circumferentially neighboring guide vanes having a relatively thick profile at a part-chord location.

In the partial vane array of FIG. 4, the reversed curvature of the mean camber line also helps achieve the desired convergence of passage portion 80 because just aft of the vane leading end, the concave part of surfaces 44 and the convex portion of surfaces 46 converge toward each other. However, as seen in the high solidity vane array of FIG. 5, the desired convergence can be achieved without reversing the curvature of the mean camber line, and without introducing excessive camber by appropriately varying the lateral thickness t with increasing chord. In the vane array of FIG. 5 the convergent portion 80 of passages 74 is formed by neighboring vanes having a relatively thick profile at a part-chord location.

In operation, fluid approaches the vane array at an incidence angle and with a Mach number, both of which can vary as a function of engine power. The thin leading end 52 of each vane allows the vane array to balance the competing interests of tolerating a satisfactorily wide variation in the incidence angle without unacceptably restricting the flow capacity of the turbine. The solidity of the array and the relative circumferential positioning of the leading and trailing ends obstruct an observer's line of sight to planes upstream of the vanes. The high solidity of the array and the chordwise convergence of the forward portions 80 of passages 74 resist fluid separation.

Although this invention has been shown and described with reference to a specific embodiment thereof, it will be understood by those skilled in the art that various changes in form and detail may be made without departing from the invention as set forth in the accompanying claims.

We claim:

1. A turbine engine guide vane array, comprising:
   a set of spanwisely and chordwisely extending guide vanes;
   a fluid flow passage defined between neighboring vanes, each passage having a chordwisely converging forward portion; and
   the vane array having a solidity selected to resist fluid separation.

2. The vane array of claim 1 wherein each vane has a leading end thickness and a trailing end thickness and the leading end thickness is approximately equal to the trailing end thickness.

3. The vane array of claim 1 wherein the solidity is at least about 3.

4. The vane array of claim 1 wherein the vanes cooperate to obstruct an observer's line of sight to a selected plane upstream of the vane array.

5. The vane array of claim 1 wherein each vane has a leading end and a trailing end and the trailing end of each vane circumferentially overlaps the leading end of a neighboring vane over at least part of the vane span.

6. The vane array of claim 1 wherein each vane has a mean camber line and the mean camber line reverses curvature at least once over at least part of the vane span.

7. The vane array of claim 1 wherein each vane has a chord line, and a flowing fluid approaches the vane array at an incidence angle and a Mach number each subject to variation across respective ranges of values extending from a first incidence angle and a higher Mach number to a second incidence angle and a lower Mach number and wherein the chord line is more closely aligned with the higher Mach number end of the Mach number range than with the lower Mach number end of the Mach number range.

8. The vane array of claim 7 wherein the trailing edge of each vane is oriented approximately axially.

9. The vane array of claim 7 wherein each vane has a leading edge angle oriented within the range of incidence angles.

10. The vane array of claim 1 wherein the vanes have a trailing edge oriented so that the tip of the trailing edge is further aft than the root of the trailing edge.

11. A turbine engine stator vane having a leading end and a trailing end each having a lateral thickness, the lateral thickness of the leading end being approximately equal to the lateral thickness of the trailing end, the vane also having a mean camber line that reverses curvature at least once over at least part of the vane span.

12. The stator vane of claim 11 comprising a cast leading segment, a cast or sheet metal trailing segment and a pair of panels extending between the leading and trailing segments.

13. The stator vane of claim 12 wherein the panels are sheet metal panels.

14. The stator vane of claim 11 wherein the vane has a root, a tip, and a trailing edge, and the trailing edge is oriented so that when the vane is installed in an engine the vane tip at the trailing edge is further aft than the vane root at the trailing edge.

15. The stator vane of claim 11 wherein the trailing end is scarfed.

16. The stator vane of claim 11 comprising a leading segment, a trailing segment and panels extending chordwisely between the segments with the leading segment being substantially entirely chordwisely forward of the panels and the trailing segment being substantially entirely chordwisely aft of the panels.

* * * * *